Sept. 8, 1936.  L. E. SMITH  2,053,974
TEMPERATURE RESPONSIVE DEVICE
Filed Dec. 14, 1934
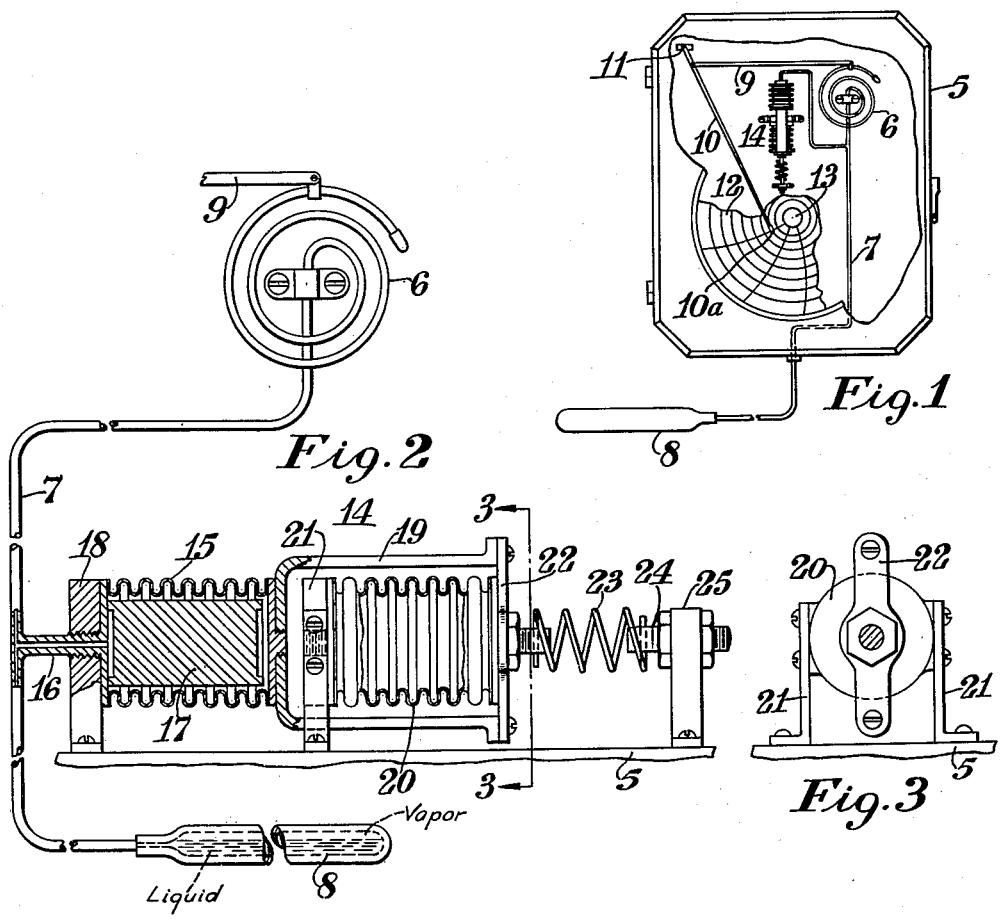
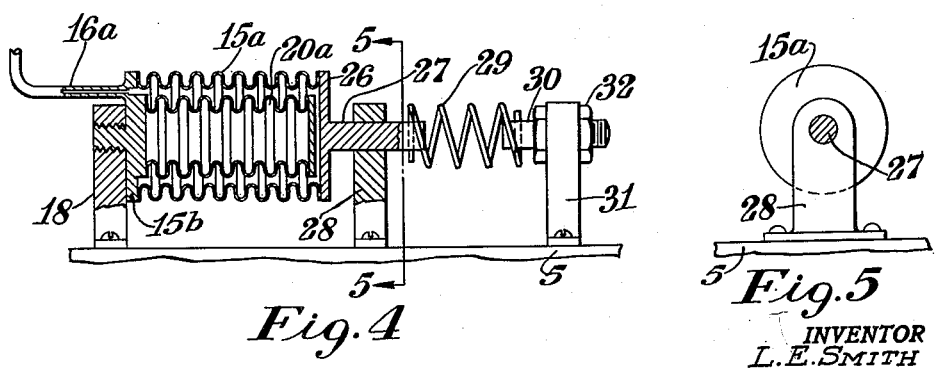
INVENTOR
L. E. SMITH
BY D. Clyde Jones
ATTORNEY Patented Sept. 8, 1936

2,053,974

UNITED STATES PATENT OFFICE 2,053,974

TEMPERATURE RESPONSIVE DEVICE

Lawrence E. Smith, Rochester, N. Y., assignor to Taylor Instrument Companies, Rochester, N. Y., a corporation of New York Application December 14, 1934, Serial No. 757,543

11 Claims. (Cl. 297—8)

This invention relates to temperature responsive devices and more particularly to vapor-actuated tube systems therefor.

In one type of temperature responsive device, the thermo-sensitive unit thereof comprises a tube system including a bulb communicating through a capillary tube with a Bourdon spring or other pressure responsive element, which tube system is partially filled with a liquid that vaporizes as the tube system and particularly the bulb thereof is subjected to heat. The changing vapor pressure, resulting from the vaporization and condensation of the liquid, actuates the Bourdon spring of the tube system. In such an arrangement it is desirable to compensate for the varying temperature conditions about the capillary tube and the Bourdon spring.

Since every vapor-filled tube system may be accidentally exposed to temperatures higher than those for which it was intended for use, it has been proposed to provide means to protect the Bourdon spring or pressure responsive element thereof against damage by the excessive pressure developed in the system as a result of such exposure.

In accordance with the present invention a novel temperature compensating and overload or protective means is provided for a vapor-actuated tube system, which means is connected to the capillary tube of the system and can be mounted within the case of the instrument or can be located at any point along the capillary tube where it may be desirable to effect temperature compensation.

For a clearer understanding of the invention reference is made to the drawing in which Fig. 1 illustrates a tube system and an instrument case of a vapor-actuated temperature recorder, a portion of the front of the instrument case being broken away to indicate generally the construction of the operating mechanism therein; Fig. 2 is an enlarged view of the tube system with the temperature compensating and overload protective unit of Fig. 1 attached thereto, said unit being partially in section; Fig. 3 is a sectional view of the unit taken on the line 3—3 of Fig. 2; Fig. 4 is a sectional view of a modified type of temperature compensating and overload protective unit which may be substituted for that shown in Fig. 2; and Fig. 5 is a sectional view of this modified unit taken on the line 5—5 of Fig. 4.

Referring especially to Fig. 1, 5 designates an instrument case within which there is mounted the operating mechanism of a temperature recorder. This mechanism is operated by a tube system including a Bourdon spring 6 which is connected by a capillary tube 7 to a bulb 8. The Bourdon spring, the capillary tube and a portion of the bulb 8 of the tube system is filled with a liquid, such as methyl ether, which vaporizes to create a greater vapor pressure when exposed to a rising temperature and which partially liquefies to decrease the vapor pressure as the temperature is reduced. The free end of the Bourdon spring 6 is connected by a link 9 to a pen arm 10 pivoted at 11. The pen arm at its free end is provided with a stylus 10a engaging a graduated chart 12 rotated in accordance with time by suitable clock mechanism of which only the arbor 13 is indicated.

In order to compensate for temperature changes occurring about the Bourdon spring 6 and the capillary tube 7 inside the instrument case and near it so that this portion of the tube system is unresponsive to varying temperature conditions, the temperature compensating and overload protecting unit 14 of the present invention is provided. As best illustrated in Fig. 2, this unit which is mounted on a fixed support such as the back of the instrument case 5, includes a metal spring bellows 15, the interior of which communicates through a branch capillary tube 16, with the main capillary tube 7 so that the liquid in the tube system can flow into and out of the bellows 15. A cylindrical plug 17 preferably made of material such as invar having a low coefficient of expansion, is provided within the bellows to decrease the volume of the liquid within the bellows to a minimum amount and yet to permit expansion and contraction of the bellows. The left hand end of bellows 15 is secured to a fixed bracket 18 attached to the back of the instrument case, while the other end of the bellows is attached to a movable yoke 19. This unit also includes a second bellows 20 which is completely filled with a liquid having the same or different characteristics as compared with the liquid used in the tube system. The left end of the bellows 20 is attached to fixed brackets 21 mounted on the back of the instrument, while the right hand end of this bellows is secured to a plate 22 carried on the right end of movable yoke 19. An adjustable coil spring 23 at one end, is attached to the plate 22 and is attached at its other end to an adjusting bolt and nut 24 which is carried by a bracket 25 projecting from the back of the instrument case. It will be understood that by tightening or loosening the nut with respect to its bolt the stress on spring 23 can be varied.

The general operation of the instrument is the same as that of former instruments, that is, when additional liquid in the partially filled bulb 8 vaporizes on a rise in temperature, the vapor pressure increases in the tube system causing the Bourdon spring to unwind. This motion of the spring is translated through the link 9 into a clockwise movement of the pen arm 10 so that the stylus 10a carried thereby records the temperature change on the graduated chart 12. A drop in temperature about the bulb 8 permits some of the vapor in the bulb 8 to liquefy and thereby reduces the pressure in the tube system so that the instrument operates in the reverse sense from that just described in connection with a rise in temperature.

The function of the unit 14 of the present invention is as follows: When the liquid filling medium in the Bourbon spring 6 and in the capillary tube 7 expands due to a temperature change in the atmosphere surrounding them, the liquid filled bellows 20 will likewise expand. This will compress the coil spring 23 and will move the yoke 19 toward the right (Fig. 2) causing bellows 15 to expand so that space is provided therein for the excess expanded filling liquid from the Bourdon spring and capillary tube which excess liquid would otherwise be displaced into the bulb 8. The use of the present arrangement renders it unnecessary to make the bulb 8 oversized to take care of changes in volume in the liquid due to lack of compensation.

On a drop in temperature about the Bourdon spring 6 and the capillary tube 7, the liquid in the bellows 20 will contract and the coil spring 23 will force the yoke 19 toward the left so that the bellows 15 will tend to contract thereby insuring liquid in the capillary tube, the Bourdon spring and a portion of the bulb in spite of the varying temperature thereabout. The coil spring 23 may be so adjusted that when the bulb 8 is overheated thereby increasing the pressure in the tube system beyond its spring pressure rating, the bellows 15 connected through the branch capillary tube 16 to the main capillary tube 7 will be allowed to expand, thereby removing all of the liquid from the bulb itself and thus decreasing the vapor pressure in the system so that excessive pressure will not be applied to the Bourdon spring 6.

In the modified form of the invention shown in Figs. 4 and 5, the branch capillary tube 16a communicates with the bellows 15a. This bellows likewise has one end fixedly mounted on a bracket 18 and its other end secured to a movable plate 26. This plate is provided with a guide rod 27 preferably coinciding with the main axis of the bellows 15a which guide rod is slidable in an opening in a fixed bracket 28. A coil spring 29 having one of its ends inserted in an opening in the guide rod 27 has its other end secured in an opening in a bolt 30. This bolt passes through an opening in a bracket 31 and is engaged by a nut 32 to change the adjustment of the stress on the spring 29. Within the bellows 15a there is mounted a completely sealed bellows 20a which is filled with a liquid having characteristics similar to that of the liquid employed in the tube system, or any other suitable liquid that changes its volume when subjected to varying temperatures. This bellows has one end fixed to the plate 15b of the bellows 15a and has its other end positioned adjacent the plate 26 of bellows 15a. The bellows 20a reduces the volume of the liquid contained in bellows 15a and as it expands its free end engages the plate 26 to expand the bellows 15a in like manner against the action of spring 29. This unit otherwise functions in the same manner as the first-mentioned unit but has the advantage that it is somewhat more compact than that unit.

While the invention has been disclosed in connection with a tube system employing a Bourdon spring, the invention is not to be limited to that construction. It will be understood that the present arrangement is applicable to tube systems which utilize other pressure responsive elements, such as diaphragms, instead of Bourdon springs.

I claim:

1. In a device of the class described, a tube system comprising a bulb communicating with a Bourdon spring through a capillary tube, a vaporizable liquid partially filling said tube system, an expansible chamber communicating with said tube system, a second sealed chamber containing a temperature responsive liquid therein whereby said second chamber expands and contracts in response to varying temperature conditions, and means for increasing and decreasing the volume of said first chamber as the volume of said second chamber respectively increases and decreases.

2. In a device of the class described, a tube system comprising a bulb communicating with a Bourdon spring through a capillary tube, a vaporizable liquid completely filling said Bourdon spring, said capillary tube and a portion of said bulb, an expansible chamber communicating with said capillary tube, a relatively inert element in said chamber to reduce the volume thereof, a fixed support to which one end of said chamber is attached, a yoke attached to the other end of said chamber, a second completely sealed expansible chamber having a temperature responsive liquid therein, one end of said second chamber being secured to a fixed support adjacent said other end of the first chamber, the other end of said second chamber being attached to said yoke whereby a change in volume in said second chamber effects a corresponding change in volume in said first chamber.

3. In a device of the class described, a tube system comprising a bulb communicating with a Bourdon spring through a capillary tube, a vaporizable liquid completely filling said Bourdon spring, said capillary tube and a portion of said bulb, an expansible chamber communicating with said capillary tube, a relatively inert element in said chamber to reduce the volume thereof, a fixed support attached to one end of said chamber, a yoke attached to the second end of said chamber, a second completely sealed expansible chamber having a temperature responsive liquid therein, one end of said second chamber being secured to a fixed support adjacent the second end of the first chamber, the other end of said second chamber being attached to said yoke whereby a change in volume in said second chamber effects a corresponding change in volume in said first chamber, and an adjustable spring engaging the end of said yoke.

4. In a system of the class described, a tube system comprising a bulb communicating with a Bourdon spring through a capillary tube, a vaporizable liquid filling said Bourdon spring, said capillary tube and a portion of said bulb, an expansible chamber communicating with said capillary tube said chamber having one of its ends fixed and having its other end acting against a spring, a second completely sealed chamber filled with a temperature responsive liquid, said second chamber being mounted within said first chamber whereby the tube system is compensated for varying temperature conditions about said capillary tube and Bourdon spring.

5. In a device of the character described, a tube system comprising a bulb communicating with a pressure-responsive element through a capillary tube, liquid medium normally filling said element and tube as well as a portion only of said bulb, at least a portion of said medium being vaporizable, an expansible chamber communicating with said tube system, said chamber being expansible under vapor pressure in said tube system to such a volume as to permit said liquid medium to pass completely out of said bulb when the bulb is heated beyond a given temperature, and means responsive to varying temperature conditions around a portion of said tube system exclusive of said bulb for varying the volume of said chamber.

6. In a device of the character described, a tube system comprising a bulb and a pressure responsive element communicating with each other through a capillary tube, liquid medium normally filling said element and tube as well as a portion only of said bulb, at least a portion of said medium being vaporizable, an expansible chamber of large size communicating with said capillary tube, a member of relatively inert material within said chamber to reduce the volume thereof, said chamber being expansible under vapor pressure in said tube system to such a volume as to permit said liquid medium to pass completely out of said bulb when the bulb is heated beyond a given temperature, and means responsive to varying temperature conditions around said element and capillary tube for varying the volume of said chamber.

7. In a device of the character described, a tube system comprising a bulb communicating with a pressure-responsive element through a capillary tube, liquid medium normally filling said element and tube as well as a portion only of said bulb, at least a portion of said medium being vaporizable, an expansible chamber communicating with said tube system, said chamber being expansible under vapor pressure in said tube system to such a volume as to permit said liquid medium to pass completely out of said bulb when the bulb is heated beyond a given temperature, and means including a sealed expansible chamber containing a liquid responsive to varying temperature conditions around said element and capillary tube, said means serving to vary the volume of said first-mentioned chamber.

8. In a device of the character described, a tube system comprising a bulb communicating with a pressure responsive element through a capillary tube, liquid medium normally filling said element and said capillary tube as well as a portion only of said bulb, an expansible chamber communicating with said tube system, said chamber being expansible under vapor pressure in said tube system to such a volume as to permit said liquid medium to pass completely out of said bulb when the bulb is heated beyond a given temperature, and means for exerting a predetermined adjustable pressure against said chamber tending to prevent expansion thereof.

9. In a device of the character described, a tube system comprising a bulb communicating with a pressure responsive element through a capillary tube, a vaporizable liquid normally filling said element and said capillary tube as well as a portion only of said bulb, and an expansible chamber communicating with said tube system, said chamber being responsive only to predetermined excessive pressures developed in said system and being expansible to such a volume as to permit said liquid to pass completely out of said bulb when the bulb is heated beyond a given temperature.

10. In a device of the character described, a tube system comprising a bulb communicating with a pressure responsive element through a capillary tube, a thermosensitive liquid normally filling said element and said capillary tube as well as a portion only of said bulb a chamber communicating with said tube system, said chamber being expansible under vapor pressure in said tube system to such a volume as to permit said liquid to pass completely out of said bulb when the bulb is heated beyond a given temperature, means for exerting a predetermined adjustable pressure against said chamber tending to prevent expansion thereof, and means responsive to varying temperature conditions around a portion of said tube system exclusive of said bulb for varying the volume of said chamber.

11. In a device of the character described, a tube system comprising a bulb communicating with a pressure responsive element through a capillary tube, a vaporizable liquid normally filling said element and said capillary tube as well as a portion only of said bulb, and an expansible chamber communicating with said tube system, said chamber being responsive only to predetermined excessive pressures developed in said system and being expansible to such a volume as to permit said liquid to pass completely out of said bulb when the bulb is heated beyond a given temperature, and means responsive to varying temperature conditions around a portion of said tube system exclusive of said bulb for varying the volume of said chamber.

LAWRENCE E. SMITH.

DISCLAIMER 2,053,974.—*Lawrence E. Smith*, Rochester, N. Y. TEMPERATURE RESPONSIVE DEVICE. Patent dated September 8, 1936. Disclaimer filed February 9, 1938, by the assignee, *Taylor Instrument Companies*.

Hereby enters this disclaimer to claims 8 and 9 in the specification.

[*Official Gazette March 8, 1938.*]